Sept. 29, 1931.   H. FORD   1,824,810
METHOD OF FORMING CONTROL ROD BALL JOINTS
Filed Nov. 18, 1927

INVENTOR.
Henry Ford.
BY C. R. Halbert
E. L. Davis.
ATTORNEYS.

Patented Sept. 29, 1931

1,824,810

UNITED STATES PATENT OFFICE

HENRY FORD, OF DEARBORN, MICHIGAN, ASSIGNOR TO FORD MOTOR COMPANY, OF DEARBORN, MICHIGAN, A CORPORATION OF DELAWARE

METHOD OF FORMING CONTROL ROD BALL JOINTS

Application filed November 18, 1927. Serial No. 234,069.

The object of my invention is to provide a ball joint for a control rod such as is used in connection with carburetors or ignition devices of simple, durable, and inexpensive construction.

Still a further object of my invention is to provide a ball joint for a control rod which is readily attachable and detachable and which is substantially indestructible under ordinary service conditions.

Still a further object of my invention is to provide a ball joint wherein a housing is provided, having a slot and a rounded end adjacent thereto, designed to receive a ball on the end of one control rod, and to provide in combination therewith a second headed control rod having a spring co-acting with said head and the housing whereby the head may be yieldingly urged against the ball on the end of the other control rod to hold the parts in their proper position but to permit intentional removal of the parts, and to compensate for wear.

Still a further object of my invention is to provide a method of forming a housing for a control rod ball joint and for assembling the parts of said joints in a convenient and economical manner.

With these and other objects in view, my invention consists in the arrangement, combination, and construction of the various parts of my improved device, as described in the accompanying specification, claimed in the claims, and illustrated in the accompanying drawings, in which:

Figure 3:
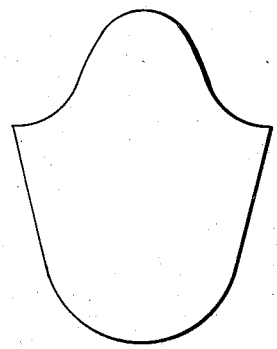
Figure 3 shows the blank from which the housing is formed.

Referring to the accompanying drawings, I have used the reference numeral 10 to indicate generally a control rod having a ball 11 formed at the end thereof. A second control rod 12 has an enlarged head 13 formed integral therewith which is preferably formed with a concave recess 14 in the end of said enlarged head having a curvature conforming to the curvature of the ball 11.

Figure 4:
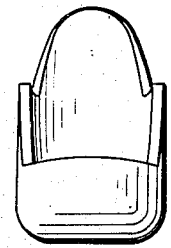
Figure 4 shows the first operation on said blank.
Figure 5:
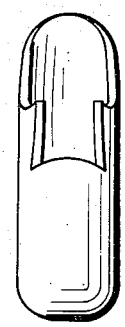
Figure 5 shows the second operation on said blank.
Figure 6:
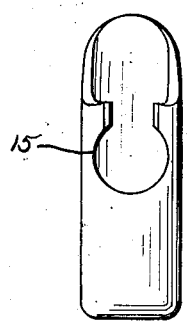
Figure 6 shows the blank after it has had the slot milled therein to receive the ball on the detachable control rod.
Figure 7:
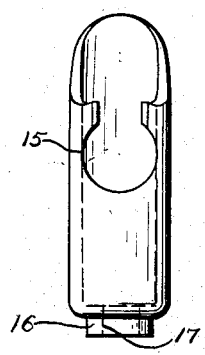
Figure 7 shows the blank after it has had the hole drilled therethrough to receive the control rod which is mounted therein.
Figure 2:
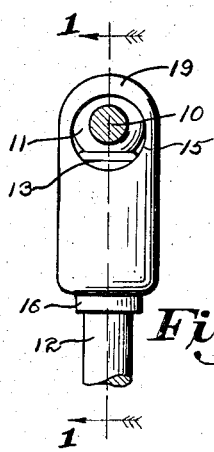
Figure 2 shows an elevation of the housing.
Figure 1:
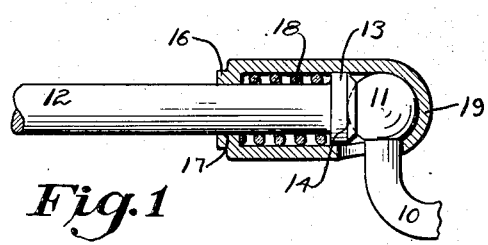
Figure 1 shows an elevation of a control rod ball joint constructed in accordance with my invention, the housing being shown in section to better illustrate the construction thereof.

A housing is formed from sheet metal and designed to connect the rod 10 with the rod 12 to permit universal movement of these rods relative to each other and to permit the rod 10 to be detached from the rod 12 or readily reattached. This housing is formed from a sheet metal blank which is initially blanked off to the shape shown in Figure 3. This blank is then placed in suitable dies and cupped at one end to the form illustrated in Figure 4. The upper end of this blank is rolled to form a continuation of a portion of the sides of the cup. The blank so formed is then put into another set of dies and struck to elongate same and to increase the proportionate length of the cup portion as distinguished from the open sided upper portion. The hole 15 is then suitably formed by drilling or milling it to the proper diameter to receive the ball 11 on the end of the control rod 10. The bottom of the cup is then punched out to form the reinforcing boss 16 and the opening 17 designed to slidably receive the control rod 12. The control 12 is then inserted in the open end of the blank such as is illustrated in Figure 7 with the spring 18 encircling the rod back of the head 13 and the parts are then placed in a suitable jig and the end of the blank is turned over to form the dome shaped end 19 by means of suitable dies whereby the spring 18 may press the concave end 14 of the rod 12 toward the closed dome end 19 of the housing. When the rod 12 is pulled to compress the spring 18 then the head 11 of the control rod 10 may be inserted between the head 13 and the dome end 19 whereupon this head 11 may be gripped by my improved connection due to the spring engagement of the concave portion 14 with one side of the ball 11 and the inside of the dome 19 with the opposite side of the ball 11. It will be seen that this connection will permit universal movement of the parts and that they may be disconnected by pulling on the rod 12 and holding the housing to compress the spring 18 at any time. Accidental displacement of the parts however is extremely unlikely under any ordinary service condition.

The practical use of this improved ball joint has been described in the course of the specification but it should be pointed out that many advantages result from the use thereof. First the various ball joints now usually used for similar purposes involve more complicated manufacturing operations and have more parts associated therewith which are subject to wear and accidental displacement. A further advantage results from the readiness with which my improved connection can be taken apart or put together and from the fact that the parts which receive the wear are sturdy and of large area so that the wear in actual use has practically no effect on the life of the joints. Still a further advantage results from the method of forming and assembling my improved joint as the assembly operations are simple and inexpensive and the resulting structure is light but relatively very strong.

Some changes may be made in the arrangement, construction, and combination of the various parts of my improved device, and it is my intention to cover by my claims such changes as may reasonably be included within the scope thereof.

I claim as my invention:

1. The method of forming a control rod ball joint consisting of, forming a head having a socket therein on the end of one of the control rods, then forming a ball on the end of the other control rod, then drawing a cup shaped housing from a sheet metal blank, then piercing an opening in the bottom of said housing adapted to slidably receive the first mentioned control rod so that the head may be enclosed by the housing, and then closing the rim of said housing to form a dome end adapted to receive the ball end formed on the second mentioned control rod.

2. The method of forming a ball joint for universally connecting a pair of control rods consisting of, drawing a cup-shaped housing, then piercing an opening in the bottom of said housing, then inserting the shank of one of the control rods through said opening so that its concave head lies within said housing, and then closing in the rim of said cup to form a dome end, the ball end of the other control rod being gripped between this dome and the concave head.

3. The method of forming a control rod ball joint housing consisting of, forming a tubular housing having an axial opening in one end of smaller diameter than the bore of the tube, said opening slidably receiving one of the control rods, then punching a slot adjacent to the other end of said housing, and then closing in the rim of said slotted end to form a dome end with which the second control rod may coact, said slot permitting the ball end on the second control rod to enter the housing between the dome end and the first mentioned control rod.

4. The method of forming a control rod ball joint consisting of, forming a ball end on one of the control rods and a socket end on the other control rod, then drawing a cup-shaped sheet metal housing, then forming a slot in the side of said cup adjacent to one end thereof, then assembling the housing over the socket end of the second mentioned control rod, then deforming said housing to permanently secure the socket end therein, and then inserting the ball end of the first mentioned control rod in said slot between said socket and the end of said housing.

5. The method of forming a control rod ball joint consisting of, forming a ball end on one of the control rods and a socket end on the other control rod, then drawing a cup-shaped sheet metal housing, then forming a slot in the side of said cup adjacent to one end thereof, then assembling the housing over the socket end of the second mentioned control rod, a coil spring having been provided around said rod adjacent to said socket which spring is enclosed by said housing, then deforming said housing to permanently secure the socket and spring therein, and then inserting the ball end of the first mentioned control rod in said slot between said socket and the end of said housing.

6. The method of forming a housing for universally connecting the ball and socket ends of a pair of control rods consisting of, forming a cup-shaped housing, then forming a slot in the side of said cup adjacent to one end thereof, then assembling the housing over said socket end, a coil spring having been provided around said rod adjacent to said socket which spring is enclosed by said housing, and then deforming said housing to permanently secure the socket end therein to thereby provide a unitary socket and housing structure.

November 1, 1927.

HENRY FORD.